United States Patent [19]

Cabasso et al.

[11] 4,073,754
[45] Feb. 14, 1978

[54] POLYMER ALLOYS OF PHOSPHONYLATED POLYSTYRENE OR POLYPHENYLENE OXIDE WITH CELLULOSE ESTER, POLYSTYRENE, OR UNSATURATED POLYESTER

[76] Inventors: Israel Cabasso, 627 Burgundy St., New Orleans, La. 70112; Joseph Jagur-Grodzinski, 22 Moskovitz St.; David Vofsi, Meonot Wolfson B, both of Rehovot, Israel

[21] Appl. No.: 604,683

[22] Filed: Aug. 14, 1975

Related U.S. Application Data

[63] Continuation-in-part of Ser. No. 569,055, April 17, 1975, Pat. No. 4,008,191, which is a continuation of Ser. No. 358,061, May 7, 1973, abandoned.

[30] Foreign Application Priority Data

May 12, 1972 Israel .................................. 39426

[51] Int. Cl.² ..................... B01D 13/04; C08L 1/10
[52] U.S. Cl. ........................... 260/17 R; 210/321 R; 252/8.1; 260/2.5 FP; 260/873; 260/874; 260/899
[58] Field of Search ............. 260/17 R, 884, 886, 260/860; 210/321 R

[56] References Cited

U.S. PATENT DOCUMENTS

3,864,289  2/1975  Pendall .................. 260/17

*Primary Examiner*—Harry Wong, Jr.
*Assistant Examiner*—Peter F. Kulkosky, Jr.
*Attorney, Agent, or Firm*—Hubbell, Cohen, Stiefel & Gross

[57] ABSTRACT

Polymer alloys of a phosphorus-containing polymer component having the formula:

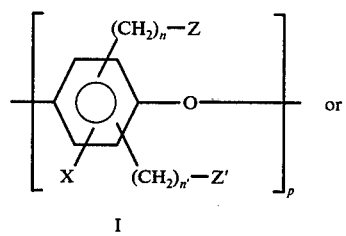

I

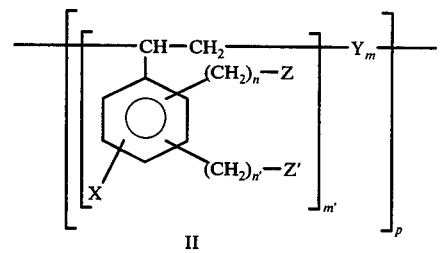

II wherein X is hydrogen or halo; Z and Z' are each hydrogen or a phosphonate group $PO(OR)(OR_1)$ in which R and $R_1$ are each alkyl or aryl, but are not both hydrogen, Y is a bivalent radical from an ethylenically unsaturated monomer copolymerized with styrene, and $m$, $m'$, $n$, $n'$ and $p$ are zero or integers as specified; and a second polymer component compatible with and alloyed with the phosphorus-containing polymer component, the second component being a cellulose ester, or a polystyrene or unsaturated polyester resin. Polymer alloys thus constituted are particularly useful as fire-retardant and flame-resistant materials, and as membranes useful in the separation of solvents exhibiting differential permeabilities therethrough.

9 Claims, No Drawings

POLYMER ALLOYS OF PHOSPHONYLATED POLYSTYRENE OR POLYPHENYLENE OXIDE WITH CELLULOSE ESTER, POLYSTYRENE, OR UNSATURATED POLYESTER

CROSS-REFERENCE TO RELATED APPLICATIONS

This is a continuation-in-part of application Ser. No. 569,055 filed Apr. 17, 1975 and now U.S. Pat. No. 4,008,191, which application was a continuation of application Ser. No. 358,061 filed May 7, 1973 and now abandoned.

BACKGROUND OF THE INVENTION

1. Field of the Invention

This invention relates to improved polymeric materials and, more particularly, to polymer alloys finding particular use as fire-retardant and flame-resistant materials, and in membranes useful in a variety of separation processes.

2. The Prior Art

The blending of polymer materials is a well established technique for improving certain properties of the polymeric system with a minimum sacrifice of its other desirable characteristics. For example, phosphorus-containing polymers have attracted considerable interest in recent years for their fire-retardant characteristics, and blends of such materials with other thermoplastic polymers have been described as possessing other improved properties while retaining the desired flame-retardant characteristics of the base polymeric material. Kraft et al. U.S. Pat. Nos. 3,725,509 and 3,819,770 may be noted in this respect.

Polymer blends of the type disclosed in the aforesaid Kraft et al. patents do not form "true" blends or "polymer alloys," i.e., blends in which the mixing of the several polymeric components is so intimate that they cannot be separated by solvents which dissolve only individual components. Only very few polymer mixtures have heretofore been recognized as forming such polymer alloys. See Encyclopedia of Polymer Science and Technology, Vol. 10, page 694 (1969). The formation of such polymer alloys is of particular interest for fiber or film applications.

Polymer alloys based on sulfonated polystyrene and copolymers of acrylonitrile have been used as ion-exchange membranes, whereas polymer alloys based on polyvinylpyrrolidone and polyisocyanates have been tested as membranes in desalination processes. Blends of polystyrene and poly(phenylene oxide) have also been described as forming polymer alloys. See *J.Appl. Polym.Sci.*, 16, 461-471 (1972) and J.Polymer Sci.Symposium No. 41, 23-32 (1973).

It is among the objects of the present invention to provide improved polymer alloys useful both for their improved fire-retardant and flame-resistant characteristics, and for their superior permeability characteristics facilitating application as polymeric membranes for the separation of various solvent species.

SUMMARY OF THE INVENTION

In accordance with the present invention, polymer alloys are provided by the intimate admixture of a. a phosphorus-containing polymer component having the formula:

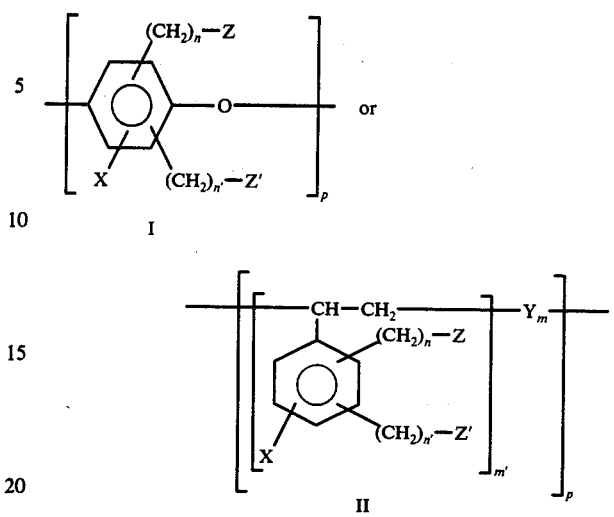

wherein

X is hydrogen or halo;

Z and Z' are each hydrogen or a phosphonate group $PO(OR)(OR_1)$ in which R and $R_1$ may be the same or different and are each alkyl or aryl, and in which Z and Z' are not both hydrogen;

Y is a bivalent radical from an ethylenically unsaturated monomer copolymerizable with styrene;

m is zero or an integer less than 10;

m' is an integer less than 10;

n is an integer;

n' is zero or any integer; and p is an integer greater than 10; and b. a second polymer component compatible with and alloyed with the phosporus-containing polymer component, the second component being a cellulose ester, or a polystyrene or unsaturated polyester resin.

The polymeric phosphonate component of the polymer alloys hereof may be prepared in accordance with well known reactions, e.g., by chloromethylation, bromination and "Arbuzov"-type phosphonylations, as more fully described in our paper in the *J.Appl.Polym.Sci.*, 18, 1969-1986 (1974). The phosphonate polymers thereby produced are completely compatible with a number of commercially available polymeric materials, the resulting blends providing the novel polymer alloys of the present invention having outstanding properties as fire-retardant and flame-resistant materials. Moreover, the permeability characteristics of the polymer alloys make them particularly suitable for use as membranes for the separation of various molecular species, e.g., benzene, by "pervaporation" (liquid permeation) or "osmotic distillation" (the combination of osmotic permeation with conventional distillation), as more fully described in our papers in the J.Appl.Polym.Sci., 18, 2117-2136 (1974) and *J.Appl.Polym.Sci.*, 18, 2137-2147 (1974).

The disclosures in our aforesaid papers in the *J.Appl.Polym.Sci.*, 18, (1974) respecting the syntheses and compositions, the sorption, diffusion and permeation characteristics, and the pervaporation and osmotic distillation membrane applications, of the polymer alloys hereof are incorporated by this reference herein.

Dissolution of the polymer components of the polymer alloys hereof is prevented by the intimate molecular entanglement of the networks of the respective polymer components, rather than by chemical cross-linking. The absence of a cross-linked matrix facilitates diffusion of the permeating molecules when the polymer alloy is utilized in membrane form to facilitate the separation of organic materials. In accordance with a further feature of the present invention, this molecular entanglement may be further increased by partial heat cross-linking of the polymer components, thereby increasing the durability and long life of membranes incorporating the same.

These and other advantages of the invention will be apparent from the following detailed description of preferred embodiments thereof.

PREFERRED EMBODIMENTS OF THE INVENTION

As indicated hereinabove, the phosphonate component of the polymer alloys hereof is a phosphonylated styrene polymer of the formula

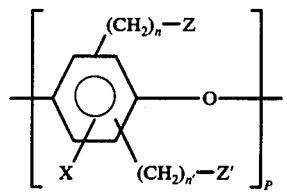

I or a phosphonylated poly(phenylene oxide) of the formula:

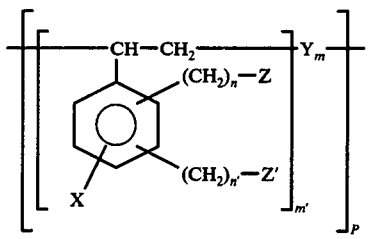

II

In the above formulae X designates a hydrogen or halogen atom. Preferably, the X moiety is bromo, since the materials thus substituted are more readily phosphonylated and exhibit superior fire-retardant characteristics. Alternatively, X may be chloro.

The Z and Z' moieties may each be hydrogen or a phosphonate group $PO(OR)(OR_1)$ in which R and $R_1$ may be the same or different and are each alkyl, preferably of from 1 to 3 carbon atoms, or aryl, preferably phenyl. At least one of the Z and Z' moieties is a phosphonate group.

Y is a bivalent radical from any ethylenically unsaturated monomer copolymerizable with styrene, e.g., the moiety resulting from the copolymerization of styrene with a nitrile of an ethylenically unsaturated carboxylic acid, e.g., acrylonitrile or methacrylonitrile; a $C_1$ to $C_{12}$ alkyl ester of acrylic or methacrylic acid, e.g., methyl methacrylate or 2-ethylhexyl acrylate; an olefin, e.g., propylene or isobutylene; or a diene, e.g., butadiene or isoprene. The Y moiety may thus be the bivalent residue of any ethylenically unsaturated styrene comonomer.

m and m' are integers less than 10 or, in the case of m, may be zero. n and n' may be any integer or, in the case of n', may be zero. Preferably n and n' are each 1; longer alkylene moieties may, however, be utilized. The use of polymers incorporating alkylene chains of from $C_1$ to $C_3$ is particularly desirable, but longer chain moieties such as described in Hay U.S. Pat. Nos. 3,262,892; 3,262,911; and 3,378,505 may also be utilized in the phosphonylated component of the polymer alloys hereof.

The second component of the polymer alloys hereof is a cellulose ester, a polystyrene or an unsaturated polyester resin.

Cellulose esters and mixed esters may thus be utilized such, for example, as acetyl cellulose (cellulose acetate), cellulose triacetate, cellulose nitrate, cellulose butyrate, cellulose propionate, cellulose acetate-butyrate, cellulose acetate-propionate, or the like.

Polystyrene resins useful as the second component of the polymer alloy include both polystyrene and copolymers of styrene or alpha-methyl styrene with a minor proportion of one or more ethylenically unsaturated comonomers such, for example, as nitriles of ethylenically unsaturated carboxylic acids including acrylonitrile and methacrylonitrile; and $C_1$-$C_{12}$ alkyl esters of acrylic and methacrylic acid such, for example, as methyl methacrylate and 2-ethylhexyl acrylate; and graft copolymers of styrene or alpha-methylstyrene and polybutadiene and other hydrocarbon elastomers.

Unsaturated polyester resins useful in the polymer alloys of the invention comprise those produced by the condensation of unsaturated dibasic acids, such as terephthalic, maleic, fumaric or isophthalic acids with dihydric alcohols such as ethylene glycol, propylene glycol, diethylene glycol or dipropylene glycols. A polymerizable monomer such, for example, as styrene, vinyl toluene, diallyl phthalate, methyl methacrylate, chlorostyrene, alpha-methyl styrene, divinyl benzene or triallyl cyanurate may also, conventionally, be incorporated in the unsaturated polyester.

The phosphorus-containing polymer component may be incorporated in the polymer alloy in an amount as low as about 1% or as high as about 90% by weight thereof. Preferably, the phosphorus-containing polymer component is utilized in amounts between about 5 and 20% by weight of polymer alloys utilized for fire-retardant purposes, and in amounts of between about 20 and 60% of materials utilized for membrane applications.

Specific embodiments illustrating the mode of preparation, formulation and application of the polymer alloys of the present invention are set forth below. Unless otherwise indicated, all parts and percentages specified are given by weight and all temperatures in degrees Celsius.

I. PHOSPHONYLATED CHLOROMETHYLATED POLYSTYRENE AND ITS COPOLYMERS

A. Chloromethylation of Polystyrene and Styrene-Vinylidene Chloride Copolymers Polystyrene and polystyrene/vinylidene chloride copolymers were chloromethylated at 25° C, in the presence of $AlCl_3$ or $ZnCl_2$ as catalysts. In the case of the copolymers gelation was not observed, provided the catalyst was added in small portions. With the high MW polystyrene, a gel-free product could be obtained only with $ZnCl_2$ as catalyst. The reaction was terminated by the addition of wet dioxane. The polymer was precipitated with methanol. The specific parameters of reaction, and the nature of the chloromethylated products thus produced, are described in Table I below:

TABLE I
CHLOROMETHYLATION OF POLYSTYRENE AND ITS COPOLYMERS WITH VINYLIDENE CHLORIDE AT 25° C

| | Polymer | Styrene vinylidene chloride in polymer | $(\eta)^a$ | Polymer g | ClCH$_2$OCH$_3$ ml | CS$_2$ ml | AlCl$_3$ g |
|---|---|---|---|---|---|---|---|
| A. | Polystyrene$^f$ | — | 0.9098 | 10 | 12 | 50 | 2.5 |
| B. | Polystyrene$^f$ | — | 0.9098 | 10 | 150 | 50 | — |
| C. | Copolymer-1 | 0.84 | 0.0332 | 2.5 | 12 | 50 | 2.0 |
| D. | Copolymer-2 | 2.12 | 0.1303 | 2.5 | 2.5 | 120 | 1 |
| E. | Copolymer-2 | 2.12 | 0.1303 | 1.5 | 1.5 | — | 0.5 |
| F. | Copolymer-2 | 2.12 | 0.1303 | 1.5 | 1.5 | — | — |
| G. | Copolymer-3 | 1.63 | 0.3359 | 10 | 10 | 50 | 7 |
| H. | Copolymer-3 | 1.63 | 0.3359 | 10 | 10 | 50 | 11 |

| | Polymer | ZnCl$_2$ g | Reaction time hr | Cl in Polymer, % Before Reaction | Cl in Polymer, % After Reaction | Degree of chloromethylation I$^b$ | Degree of chloromethylation II$^c$ |
|---|---|---|---|---|---|---|---|
| A. | Polystyrene$^f$ | — | 5 | — | 22.3 | 0.95$^d$ | 0.95 |
| B. | Polystyrene$^f$ | 10 | 20 | — | 20.6 | 0.88$^e$ | 0.86 |
| C. | Copolymer-1 | — | 5 | 38.2 | 41.8 | 0.48 | 0.72 |
| D. | Copolymer-2 | — | 5 | 22.3 | 26.0 | 0.25 | 0.20 |
| E. | Copolymer-2 | — | 2 | 22.3 | 29.0 | 0.47 | 0.45 |
| F. | Copolymer-2 | 0.5 | 4 | 22.3 | 29.7 | 0.53 | 0.42 |
| G. | Copolymer-3 | — | 7.5 | 26.6 | 34.9 | 0.76 | 0.84 |
| H. | Copolymer-3 | — | 11.5 | 26.6 | 39.0 | 1.05 | 1.26 |

$^a$Intrinsic viscosity in toluene at 25° C.
$^b$Calculated from the %Cl of the chloromethylated compound.
$^c$Calculated from the %P after phosphonylation of the product.
$^d$Gel fraction: 70% of polymer.
$^e$Gel fraction: 1% of polymer.
$^f$M$_n$ equal about 250,000.

B. Phosphonylation of the Chloromethylated Polystyrene and its Copolymers

A 5% solution of each of the chloromethylated polymers in diethyl carbitol (DEC) was added dropwise within two hours to a refluxing mixture of equal volumes of triethyl phosphite (TEP) and DEC under vigorous stirring. A slight precipitate was observed when each drop contacted the boiling solution which, however, disappeared almost immediately. The reaction mixture was refluxed for an additional two hours after completing addition of the polymer solution. The mixture was then poured into excess pentane and the precipitated product was purified by dissolution in methylene chloride and reprecipitation with pentane.

TABLE II
PHOSPHONYLATION OF CHLOROMETHYLATED POLYSTYRENE AND ITS COPOLYMERS

| Example | Parent polymer* | Solvent | Cl in reacting polymer % | Cl in product polymer % | P. % | Gel, % | Designation of product |
|---|---|---|---|---|---|---|---|
| 1 | Polystyrene | TEP | 22.3 | 1.5 | 10.9 | 85 | PSP |
| 2 | Copolymer-1 | TEP | 41.8 | 26.9 | 7.6 | none | PVBP |
| 3 | Copolymer-2 | TEP | 26.0 | 24.0 | 1.8 | none | PVBP |
| 4 | Copolymer-2 | TEP | 29.0 | 15.7 | 6.5 | 40 | PVBP |
| 5 | Copolymer-2 | TEP | 34.9 | 24.5 | 6.1 | 90 | PVBP |
| 6 | Polystyrene | DEC+TEP | 20.6 | — | 11.0 | 1.5 | PSP |
| 7 | Copolymer-3 | DEC+TEP | 34.9 | 15.1 | 9.2 | none | PVBP |
| 8 | Copolymer-3 | DEC+TEP | 39.0 | 9.1 | 10.5 | none | PVBP |

*See Table I.

The phosphonylated polymers incorporated in following monomeric units:

Phosphonylated Polystyrene
(Examples 1 and 6)

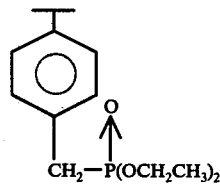

-continued

Phosphonylated Styrene Copolymers
(Examples 2–5, 7 and 8)

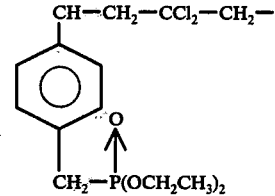

Detailed Preparation of Poly(vinylidene chloride-benzyldiethyl phosphonate) Copolymer Type (PVBP) of Example 7

By way of further illustration, a polyphosphonate of the type exemplified in Example 7 was prepared by initially dissolving 10 g of the styrene-vinylidene chloride copolymer (Copolymer-3 above) in 50 ml dry carbon disulfide and 50 ml chlorodimethyl ether, and thereafter slowly adding 10 g AlCl₃ to the vigorously stirred solution. Reaction was continued for 7 hours at room temperature. Wet dioxane was then added until purple coloration of the solution disappeared.

The polymeric material was precipitated with methanol, redissolved in methylethyl-ketone, filtered and again precipitated with methanol. Five g of the thus chloromethylated copolymer (Cl = 35.9%) were dissolved in 25 ml of the dry bis (2-ethoxy ethyl) ether (DEC) and the solution was added dropwise to 30 ml of the vigorously stirred triethylphosphite (TEP) at 150°–160°.

The reaction mixture was refluxed for 4 hours. After cooling to room temperature, the polymer product was precipitated with pentane. Poly(vinylidene chloride — benzyldiethyl phosphonate) (Cl = 15.1%, P = 9.2%), PVBP, was obtained in 90% yield.

The polymer was non-flammable and highly hygroscopic. When immersed in water, one part absorbed at room temperature up to 2.5 parts of water. The PVBP was soluble in aromatic hydrocarbons, ketones, dioxane and hot methanol. The product incorporated the following monomeric unit, as verified by NMR spectroscopy:

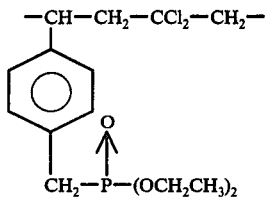

EXAMPLE 9

Preparation of Polybenzyldiethylphosphonate Polymer Type (PSP) of Examples 1 and 6

High molecular weight polystyrene was used as the starting material in this example. The chloromethylation was catalyzed by ZnCl₂ and the reaction time was 24 hours. Otherwise, the procedure was the same as utilized above in connection with the detailed preparation of the Example 7-type polymer.

Polybenzyldiethylphosphonate (Cl = 1.1%; P 7.5%), PSP, was obtained in 80% yield. Its intrinsic viscosity in toluene (η) 25° = 0.944 dl/g. The PSP was non-flammable and hygroscopic. When immersed in water, one part absorbed up to 0.5 parts of water at room temperature. It was soluble in aromatic hydrocarbons, ketones, dioxane and hot methanol. Its formula, as verified by NMR spectroscopy, incorporated the following repeating unit:

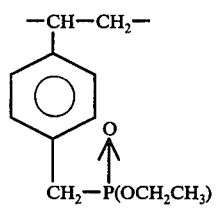

EXAMPLE 10

Preparation of Further Poly(vinylidene chloridebenzyldiethyl phosphonate) Copolymer (PVBP)

The same procedure as described in connection with the detailed preparation of the Example 7-type polymer was followed except that the reaction time of the chloromethylation was 8 hours and the amount of the chlorodimethylether was 20% larger than that used in the Example 7 preparation. A further PVBP-type polymer, containing 10.63% Cl and 10.5% P, was obtained in 90% yield. The product was non-flammable and highly hygroscopic. When immersed in water, one part absorbed 3 parts of water at room temperature. The solubility properties of the polymer were similar to those of the PVBP product described above.

EXAMPLE 11

Preparation of Other Phosphonylated Styrene Copolymers

The following additional types of styrene copolymers were prepared by chloromethylation on the styrene ring, followed by phosphonylation. The comonomers, and the Y moiety in the backbone of the styrene copolymers formed therewith, were as follows:

| Comonomer | Y Moiety |
|---|---|
| butadiene | $-CH_2-CH=CH-CH_2-$ |
| acrylonitrile | $-CH-CHCN-$ |
| acrylonitrile-butadiene | $-CH-CHCN-CH_2-CH=CH-CH_2-$ |
| fumarate esters | $-CH(COOR')-CH(COOR'')-$ |
| | [wherein R' and R'' may have from 1 to 4 carbon atoms] |
| isoprene | $\begin{array}{c} CH_3 \\ | \\ -CH_2C=CH-CH_2- \end{array}$ |
| isobutylene | $-CH-CH(CH_3)-CH_2-$ |
| maleic anhydride | $\begin{array}{c} -CH\text{—}CH- \\ |\quad\quad| \\ CO\quad CO \\ \diagdown\diagup \\ O \end{array}$ |
| methyl acrylate | $-CH_2-CH(COOCH_3)-$ |
| methyl methacrylate | $\begin{array}{c} -CH_2-C(COOCH_3)- \\ | \\ CH_3 \end{array}$ |
| propylene | $-CH_2-CH_2-CH_2-$ |

The above types of styrene copolymers were chloromethylated in accordance with the procedure described in connection with the detailed preparation of the Example 7-type polymer. The chloromethylated product was precipitated in a 1:1 mixture of methanol/hexane. Five g of the dry chloromethylated copolymer was thereafter dissolved in dry DEC and the solution was added dropwise to 30 ml of vigorously stirred TEP at 150°–160°. Further handling of the reaction mixture was in accordance with the procedure described in the detailed preparation of the Example 7-type polymer.

Copolymers containing 6–12% P as diethyl phosphonate esters were thereby obtained. The copolymers were non-flammable, highly hygroscopic and soluble in acetone, dioxane and THF. They formed homogeneous alloys with acetyl cellulose when treated as per the procedure of Example 38 below.

II. PHOSPHONYLATED POLY(PHENYLENE OXIDE) DERIVATIVES

A. Bromination of poly(2,6-Dimethyl-1,4-phenylene Oxide) (PPO)

Procedure A. A substitution of 1 bromine atom in the aromatic ring was achieved at room temperature by the dropwise addition of 1 mole-equivalent of bromine to a 1% solution of PPO in $CCl_4$ or in chloroform.

Procedure B. A substitution of 1 bromine atom in the aromatic ring and 1 bromine atom in the side chain was achieved by the dropwise addition at room temperature of 1 mole-equivalent of bromine to 1% PPO in tetrachloroethane (TCLE), increase of the temperature to reflux after termination of evolution of HBr, illumination of the reaction mixture with a Hg lamp and the dropwise addition (for 90 minutes) of a second mole-equivalent of $Br_2$.

Side group bromination [Chem. Res., 63,355 (1963); J.Chem.Phys., 20, 1659 (1952)] without simultaneous ring substitution can be obtained with a low uniform bromine concentration and at a high reaction temperature. Under these conditions, the radical reaction takes precedence over the electrophilic attack.

Procedure C-1. A product containing 90% side chain-substituted mono-bromide and 10% bromine in the aromatic rings was obtained by dropwise addition of 1 mole-equivalent of bromine to a 0.1% solution of PPO in TCLE maintained at reflux. Reflux was continued for 60 minutes after the addition of bromine was complete.

Good results are also obtained when N-bromosuccinimide (NBS) is used as the brominating agent.

Procedure C-2. NBS, 1.1 mole-equivalents, was suspended in a 0.5% solution of PPO in $CCl_4$. The reaction mixture was illuminated with a Hg lamp and refluxed for 6 hours.

Procedure D-1. NBS, 2.6 mole-equivalents, was suspended in a 0.6% solution of PPO in a $CCl_4$-chloroform mixture (3/1 W/W). The reaction mixture was illuminated with a Hg lamp and refluxed for 6 hours.

Procedure D-2. A side chain-substituted dibromide can also be prepared by dropwise addition of 2 mole-equivalents of bromine to a 0.1% solution of PPO in TCLE maintained under reflux. After the addition of bromine was complete, the reaction mixture was refluxed for 60 minutes.

A product in which 2 hydrogen atoms in some of the methyl side groups were substituted by bromine (69.9% total Br) was obtained by modification of this procedure.

Procedure E-1. Bromine, 4.2 mole-equivalents, was added dropwise to a 0.1% solution of PPO in TCLE maintained under reflux. When the addition of bromine was complete, reflux of the reaction mixture was continued for 90 minutes while catalytic quantities (3–4 mg) of benzoyl peroxide were added at 15 minute intervals.

Procedure E-2. Bromine, 2 mole-equivalents, was added dropwise to a 0.1% solution of PPO in TCLE maintained under reflux. Reflux was continued after the bromine addition was completed. The reaction mixture was illuminated with the Hg lamp, and 2 mole-equivalents of NBS were added. Reflux was continued for 6 hours.

The thus brominated polymers were precipitated with pentane and purified by dissolution in methylene chloride, followed by reprecipitation. The specific bromination techniques experimentally utilized and products obtained therewith are summarized in Table III below:

TABLE II

BROMINATION OF POLY(2,6-DIMETHYL-1,4-PHENYLENE OXIDE)

| Procedure | PPO, moles | Reagent, moles | Solvent | Br in polymer, % | Br in monounit (theoretical %) | Br atoms per phenyl group[a] | Br in side groups per monounit[a] | | |
|---|---|---|---|---|---|---|---|---|---|
| | | | | | | | $CH_2Br$ | $CHBr_2$ | $CBr_3$ |
| A | 0.82 | 1.0 $Br_2$ | $CCl_4$ | 43.5 | 40 | 1.02 | 0 | 0 | 0 |
| B | 0.82 | 1.9 $Br_2$ | TCLE | 59 | 57 | 1.1[b] | 1 | 0 | 0 |
| C-1 | 0.09 | 0.1 $Br_2$ | TCLE | 41.5 | 40 | 0.1 | 0.9 | 0 | 0 |
| C-2 | 0.41 | 0.5 NBS | $CCl_4$ | 38 | 40 | 0 | 0.9 | 0 | 0 |
| D-1 | 0.50 | 1.3 NBS | $CHCl_3/CCl_4$ 25%/75% | 60 | 57 | 0.2 | 1.7 | 0.1 | 0 |
| D-2 | 0.045 | 0.9 $Br_2$ | TCLE | 57 | 57 | 0.1 | 1.9 | 0 | 0 |
| E-1 | 0.5 | 2.1 $Br_2$ | TCLE | 66.9 | — | 0.1 | 1.0 | 0.5 | 0 |
| E-2 | 0.5 | 1 $Br_2$ 1 NBS | TCLE | 70.1 | — | 0.1 | 1.0 | 0.5 | 0.17 |

[a]Data based on NMR.
[b]69% Para and 31% ortho to the $-CH_2Br$ group.

B. Phosphonylation of Brominated PPO Products

The brominated polymers were phosphonylated by the Michaelis-Arbuzov reaction, utilizing the dropwise addition of solutions of the chloromethylated parent polymers to a refluxing solvent mixture, as described in Section IB above. The phosphonylation products thus formed are identified in Table IV:

TABLE IV.

PHOSPHONYLATED PPO DERIVATIVES

| Example | Monounit | Polymer designation | P atoms per monounit | Br atoms per monounit |
|---|---|---|---|---|
| 12 | 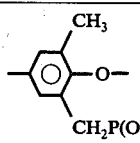 | PPOP | 0.5–1.3 | 0–0.25 |

TABLE IV.-continued
PHOSPHONYLATED PPO DERIVATIVES

| Example | Monounit | Polymer designation | P atoms per monounit | Br atoms per monounit |
|---|---|---|---|---|
| 13 | CH₂P(O)(OR)₂ / ⟨O⟩—O— / CH₂P(O)(OR)₂ | PPOP₂ | 1.4–2.0 | 0–0.50 |
| 14 | CH₃ / ⟨O⟩—O— / Br, CH₂P(O)(R)₂ | PPOBr₄P | 1.0–1.3 | 1.0–1.25 |
| 15 | {CH₃ etc.} / ⟨O⟩—O— / {CH₂P(O)(OR)₃, CHBr₂, CBr₃} | PPOPBr | 1.0–1.3 | 1.0–2.0 |
| 16 | {CH₃ etc.} / ⟨O⟩—O— / Br, {CH₂P(O)(OR)₃, CHBr₂, CBr₃} | PPOPBr₂P | 1.0–1.3 | 1.0–3.5 |

EXAMPLE 17

A polymer of the type of Example 16 was prepared by initially dissolving 12 g of PPO in 175 ml of TCLE, vigorously stirring the solution and adding 22 g of bromine dropwise at room temperature. Addition of the bromine was completed within 15–20 minutes. Stirring was continued for about one hour (until evolution of HBr nearly terminated). The NMR spectrum of an aliquot sample indicated that at this stage poly(2,6-dimethyl-3-bromo-1,4-phenylene oxide) had been formed in nearly stoichiometric yield.

The solution was then brought to reflux, exposed to actinic light and an additional 72 g of bromine added dropwise within a 3-hour period. Reflux was continued until evolution of HBr ceased. The solution was then cooled to room temperature and polymer precipitated by methanol. It contained 69.8% bromine and its NMR spectrum indicated that nearly all methyl groups on the polymeric chain were brominated.

Ten g of the brominated polymer were dissolved in 50 ml of dry dioxane and the solution was added dropwise within 30 minutes to 50 ml of vigorously stirred and nearly boiling trimethyl phosphite. Reflux was continued for another 15–20 minutes until the solution cleared up completely. The reaction mixture was cooled to room temperature and the polymer precipitated with pentane, redissolved in dioxane and again precipitated with pentane. It contained 42% Br and 9.2% P and contained the following repeating monounits:

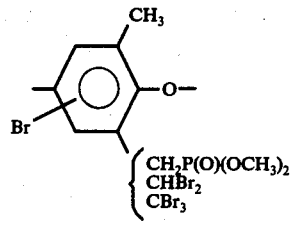

The bromo-phosphated polymer, designated herein as PPOBrP₂, was obtained in 95% yield. The PPOBrP₂ was soluble in dioxane and partially soluble in acetone. It was completely non-flammable and could be spun from its solutions into fibers or cast into mechanically strong films (tensile strength — 3 kg/mm2).

EXAMPLE 18

Preparation of Poly(2-methyl-6-methylenedimethylphosphonate-3-bromo-1,4-phenylene oxide) (PPOBrP₁)

The procedure described in Example 17 was repeated to produce a phosphonylated polymer of the type of Example 14, except that in the bromination step CCl₄ was used as the solvent instead of TCLE, and the total amount of bromine used for the bromination was 36 g.

Poly(2-methyl-6-methylenedimethylphosphonate-3-bromo-1,4-phenylene oxide), designated herein as PPOBrP₁, was obtained in 90% yield. The product contained 30.4% Br and 9.6% P. Its structure, as verified by NMR spectroscopy, was as follows:

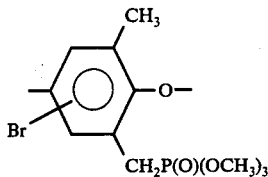

The PPOBrP$_1$ was soluble in dioxane, THF and chlorinated hydrocarbons, was non-flammable and slightly hygroscopic. It could be spun from its solution into fibers or cast into mechanically strong films (tensile strength — 2.5 kg/mm$^2$).

EXAMPLE 19

Poly(2-methyl-6-methylenediethyl phosphonate-3-bromo-1,4-phenylene oxide) (PPOBrP$_2$)

The procedure of Example 18 was repeated, except that TEP was used instead of trimethyl phosphite for the phosphonylation. Poly(2-methyl-6-methylenediethyl phosphonate-3-bromo-1,4-phenylene oxide), designated herein as PPOBrP$_2$, was obtained in 92% yield. The product contained 8% Br and 9.1% P and incorporated the following repeating monomeric unit:

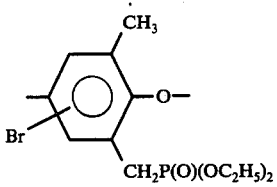

The PPOBrP$_2$ was soluble in dioxane, THF and chlorinated hydrocarbons, was non-flammable and slightly hygroscopic. It could be spun from its solutions into fibers or cast into mechanically strong films (tensile strength — 2.5 kg/mm$^2$).

EXAMPLE 20

A mixed polymer of the type of Examples 12 and 13 above was prepared by dissolving 30 g of PPO in 500 ml of CCl$_4$ and 150 ml of CHCl$_3$. 92 g of NBS was added to the solution, which was thereafter exposed to actinic light and refluxed for one hour. Then, additional portions of NBS, 92 g each, were added in one-hour intervals. Reaction was continued for about 10 hours until the NBS was completely converted into succinimide. The solution was cooled to room temperature and polymer precipitated with methanol, redissolved in methylene chloride and again precipitated with methanol. The NMR spectrum indicated that about 60% of the methyl groups in the PPO were brominated and no bromine substitution in the aromatic ring took place.

The thus brominated product was phosphonylated in the manner described in Example 17 above, with the formation of a polymer (PPOP) incorporating the following monomeric units:

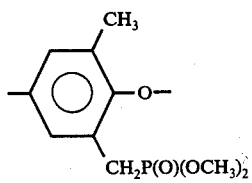

-continued
and

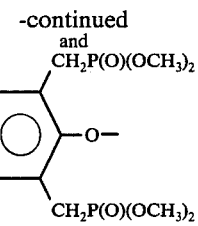

The PPOP was non-flammable and slightly hygroscopic, was soluble in dioxane and could be spun from its solutions into fibers or cast into films (tensile strength — 2.9 kg/mm$^2$).

III. POLYMER ALLOYS OF POLYPHOSPHONATES AND OTHER COMPATIBLE POLYMERS

The following further examples illustrate the formation of polymeric alloys of the polyphosphonates hereof with acetyl cellulose, polystyrene and unsaturated polyester resins. Membranes of these materials are highly permeable to benzene and to other aromatic solvents, and may be used for their selective removal from mixtures with other solvents such as, for example, saturated or unsaturated aliphatic hydrocarbons, by the known technique of "pervaporation." Such alloys are self-extinguishing and some compositions are also non-flammable. They may be used in the form of fibers, foams, fabrics, films and the like.

EXAMPLES 21-34

Polyphosphonate/Cellulose Derivative Polymer Alloys

PVBP/Acetyl Cellulose Polymer Alloy Membrane 5.5 g of PVBP prepared as described in connection with the detailed preparation of the polyphosphonate of Example 7, and 8.5 g of acetyl cellulose (Eastman-Kodak 394-45) were dissolved in 100 g of dioxane. A 100$\mu$ thick film was cast with a doctor blade on a glass plate. Dioxane was evaporated at room temperature for 24 hours. Remaining dioxane was removed under vacuum at 30° for 3 hours.

A transparent homogeneous membrane was stripped off the glass plate after it was immersed in water. It was self-extinguishing (see Table V below) and its tensile strength was 6.3 kg/mm$^2$.

PPOP/Acetyl Cellulose and PPOP/Cellulose Triacetate Polymer Alloy Films

Polymer films consisting of polymer alloys were prepared from PPOP and acetyl cellulose and cellulose triacetate, respectively, in the same way as described above for PVBP. Transparent, mechanically strong (tensile strength of the PPOP/acetyl cellulose film was 5.9 kg/mm$^2$) films were obtained. The films were non-flammable and acted as highly permeable membranes for aromatic hydrocarbons.

PPOBrP$_2$/Acetyl Cellulose Polymer Alloys

Polymer alloys consisting of PPOBrP$_2$ and acetyl cellulose were prepared in the same manner as described in connection with the PVBP-containing alloys, except that the ratio of the two polymers was modified.

Table V summarizes the tensile strength and fire-retarding properties of polymer alloy films prepared as described above for the various polyphosphonate/cellulose derivative polymer alloys. Table VI summarizes the water uptake of other polyphosphonate/acetyl cellulose polymer alloy films; it will be noted that the water uptake of such materials is sharply reduced by blending with acetyl cellulose, indicating markedly improved dimensional stability of the polymer alloy films vis-a-vis the polyphosphonates per se.

TABLE V

TENSILE STRENGTH AND FLAMMABILITY OF POLYMER ALLOY FILMS

| Example | Polymer Alloy Components I | | II | | Tensile Strength Kg/mm$^2$ | Flammability* (ASTM D) 1433 – 58 |
|---|---|---|---|---|---|---|
| 21 | Cell. acetate (Eastman 394–45) | 100% | — | | 8.0 | burn - 3.5 cm/sec. |
|  | " | 80% | PPOBrP$_2$ | 20% | 7.3 | self-extinguishing (2–2.5 sec., 3–6 cm) |
| 22 | " | 75% | " | 25% | 6.4 | self-ext. (0–2 sec., 0–4 cm) |
| 23 | " | 70% | " | 30% | 6.3 | self-ext. (0–1.5 sec., 0–2 cm) |
| 24 | " | 60% | " | 40% | 6.0 | non-flammable |
| 25 | " | 50% | " | 50% | 5.8 | non-flammable |
| 26 | " | 50% | PPOP | 50% | 5.9 | non-flammable |
| 27 | " | 60% | PVBP | 40% | 6.3 | self-ext. (2–3 sec., 5–6 cm) |
| 28 | " | 50% | PBP | 50% | 5.7 | self-ext. (1–2 sec., 2–4 cm) |
| 29 | cell. triacetate (A–43.2%) | 75% | PPOBrP$_2$ ↓ | 25% ↓ | 4.75 | self-ext. (0–2 sec., 0–2 cm) |
| 30 | " | 75% | PPOP | 25% | 4.7 | self-ext. (1–2 sec., 1–2 cm) |

*Determined for 20μ thick films

TABLE VI

WATER UPTAKE OF POLYPHOSPHONATES AND POLYMER ALLOYS THEREOF

| Ex. | Polymer Alloy Components I | | II | | Water uptake after 24 hours immersion in water at 25° C. |
|---|---|---|---|---|---|
| — | Cellulose acetate (Eastman 394–45) | — | PVBP | 100% | 250% |
| 31 | " | 20% | " | 80% | 18% |
| 32 | " | 30% | " | 70% | 10% |
| 33 | " | 20% | PPOBrP$_2$ | 80% | 10% |
| — | | — | PBP | 100% | 50% |
| 34 | " | 20% | " | 80% | 10% |

EXAMPLE 35

PPOBrP$_2$/Polystyrene Polymer Alloy

Four g of PPOBrP$_2$ and 10 g of high molecular weight polystyrene $(\eta)25°$ C = 0.908 dl/g were dissolved in 100 g of dioxane at 40° C. A membrane consisting of a polymer alloy of PPOBrP$_2$ and polystyrene was prepared in the same manner as described above in connection with the PVBP/acetyl cellulose membrane, except that both casting and evaporation of dioxane were performed at 40° C. A homogeneous material was obtained. It was self-extinguishing (3 sec. according to ASTM D.635). Its hardness (Barcoll-940) was 41.

EXAMPLE 36

PPOBrP$_2$/Polystyrene Polymer Alloy 25 g of PPOBrP$_2$ were dissolved in 75 g of styrene. 0.5 g of photosensitizer (Trigonal 14) were added thereto. The solution was thereafter brought to 40° and exposed to U.V. radiation; after one hour of polymerization a transparent, homogeneous solid material was obtained. Its hardness (Barcoll-940) was 40 and it was self-extinguishing (3 sec. according to ASTM D.635).

EXAMPLE 37

PPOBrP$_2$/Polyester Polymer Alloy 3.5 g of PPOBrP$_2$ were mixed with 7.5 g of a general purpose unsaturated polyester resin (Crystic LV-191). 0.1 g of benzoyl peroxide were added to the solution thus obtained and the sample was polymerized for 24 hours at 25°. A hard, transparent polymeric material was obtained. The product hardness, according to Barcoll-940, was 46, and the material was self-extinguishing (3.5 sec. according to ASTM D.635).

IV. PERVAPORATIVE SEPARATIONS EMPLOYING THE POLYMER ALLOYS HEREOF

The following examples serve to illustrate some of the "pervaporative" separations achieved with membranes constituted of the polymer alloys of the present invention.

The differential permeability of various organic solvents, e.g., aromatic hydrocarbons such as benzene and cyclohexene, or ethanol, in the polymer alloys of the present invention, and pervaporation and osmotic distillation techniques for effecting separation of these or other components from admixture with other organic solvents, e.g., aliphatic hydrocarbons such as cyclohexane, decalin, or heptane, are more fully described in our aforesaid papers in *J.Appl.Polym.Sci.*, 18, 2117–2136 and 2137–2147, the disclosures of which are incorporated by this reference herein.

EXAMPLE 38

PVBP/Acetyl Cellulose Polymer Alloy Pervaporation Membrane

A pervaporation experiment was carried out as described in *J.Appl.Polym.Sci*, 18, 2137–2147, at 2138 et. seq. A sintered glass disc (JENA D) served as a membrane support. The effective membrane area was 12.5 cm$^2$. The product was collected in a liquid air trap. On the product side a vacuum of 25 torrs was maintained throughout the experiment.

The membrane was prepared by casting a solution of 6 g PVBP (prepared as described in connection with the detailed preparation of the Example 7-type polymer) and 6 g acetyl cellulose (Eastman 394–45) in 100 g of dioxane. The dioxane was evaporated at room temperature for 24 hours. A 20 μ thick membrane was stripped from the glass plate after immersion in water, and inserted into the pervaporation apparatus; a benzene-cyclohexane mixture was added to the apparatus and the membrane was conditioned for 1 hour while under benzene-cyclohexane reflux.

The results obtained with such membrane in a number of pervaporation experiments are summarized in Table VII:

TABLE VII

Pervaporative Separations with a PVBP/Acetyl Cellulose Polymer Alloy Membrane

| Feed composition | Temp. °C. | Permeability Kg/m$^2$ - day | Product Composition | Separation[b] Factor |
|---|---|---|---|---|
| Benzene/cyclohexane 11.5/88.5 | 80 | 1.65 | 65/35 | 14.3 |
| Benzene/cyclohexane 55/45[a] | 80 | 24.0 | 93/7 | 10.8 |
| Benzene/cyclohexane 75/25 | 80 | 48.0 | 97/3 | 10.7 |
| Benzene/cyclohexane 50/50 | 60 | 7.2 | 93/7 | 13.3 |
| Benzene/cyclohexane 50/50 | 35 | 1.5 | 95/5 | 19.0 |
| Benzene/cyclohexene 50/50 | 80 | 32.4 | 72/28 | 2.6 |
| Benzene/cyclohexane/cyclohexene 33.3/33.3/33.3 | 80 | 27.5 | 60/30/10 | — |
| Styrene/ethylbenzene 50/50 | 25 | 6.0 | 57/43 | 1.3 |

[a]Azeotropic mixture.
[b]Separation factor = product composition/feed composition.

EXAMPLE 39

PVBP/Acetyl Cellulose Polymer Alloy Pervaporation Membrane 6.25 g of PVBP prepared as described in connection with the detailed preparation of the Example 7-type polymer, and 4.37 g of acetyl cellulose (Eastman 394–45) were dissolved in a mixture of 22.5 g of acetone and 15 g of dimethyl formamide. 200 μ thick film was cast with a doctor blade on a glass plate, evaporated for 40 minutes at room temperature and immersed in ice water. The temperature was increased to 82° and the membrane was annealed for 15 hours at this temperature. A double layer membrane with a very thin, dense "skin" and a relatively porous support was thus obtained. Results obtained in a pervaporative separation of a benzene/cyclohexane mixture with this membrane were as follows:

| Feed Composition | Temp. °C | Permeability* Kg/m$^2$-day | Product Composition | Separation Factor |
|---|---|---|---|---|
| Benzene/cyclohexane 50/50 | 80 | 196 | 80/20 | 4.0 |
| Benzene/cyclohexane 50/50 | 24 | 60 | 82/18 | 4.5 |

*Permeability of a membrane, prepared under the same conditions from acetyl cellulose only was, at 80°, 3.8 kg/m$^2$ - day.

EXAMPLE 40

PPOP/Acetyl Cellulose Polymer Alloy Pervaporation Membrane 12.5 g of PPOP prepared as described in Example 20 above, and 12 g of acetyl cellulose (Eastman 394–45) were dissolved in a mixture of 50 g of acetone and 30 g of dimethyl formamide. The casting and annealing procedure was the same as described in Example 39. Pervaporization at 80° with a benzene/cyclohexane mixture resulted in a permeability of 29 Kg/m$^2$-day with a separation factor of 6.7.

EXAMPLE 41

PPOBrP/Acetyl Cellulose Polymer Alloy Pervaporation Membrane

Five g PPOBrP and 5 g acetyl cellulose were dissolved in 40 ml of dioxane. The solution was cast on a glass plate and a 20-micron thick film was obtained by evaporating all the dioxane at room temperature, as described in Example 38. The alloy membrane was then placed in a pervaporation apparatus and was tested for its ability to separate the components of several organic liquid mixtures. The results are indicated in Table VIII:

TABLE VIII

PERVAPORATIVE SEPARATIONS WITH A PROBrP/ ACETYL CELLULOSE POLYMER ALLOY MEMBRANE

| Feed Composition | Temp. °C | Permeability Kg/m$^2$ - day | Separation Factor |
|---|---|---|---|
| Benzene/cyclohexane 50/50 | 50 | 4 | 20 |
| Ethanol/heptane 48/52 | 20 | 70 | 10.7 |
| Styrene/ethylbenzene 50/50 | 20 | 5 | 1.5 |

V. CROSS-LINKED POLYMER ALLOYS

The following examples illustrate the cross-linking of the components of the polymer alloys to effect chemical bonding thereof. Such bonding imparts increased durability to membranes of the polymer alloys such as used in the separation techniques described in Examples 38–41 above. Chemically bound polymer alloys may conveniently be formed by the cross-linking of, for example, any of the PVBP, PSP, PPOBrP$_1$, PPOBrP$_2$ or PPOP phosphonate polymer components to, for example, acetyl cellulose.

EXAMPLE 42

Cross-Linking of the Polymer Alloys

Chemical bonding of the polymer alloys hereof is effected by carrying out the phosphonylation reaction of the styrene or poly(phenylene oxide) polymer components (see Sections IB and IIB above) in such a manner as to phosphonate only a portion of the benzylic halogen moieties, and to thereafter cross-link the residual benzylic halogen with the further polymer component, e.g., with the hydroxyl groups of, for example, acetyl cellulose.

In the case of the poly(vinylidene chloride-benzyl-diethyl phosphonate) (PVBP) or polybenzyldiethyl-phosphonate (PSP) polymer components, the following residual benzylic halogen moiety remains:

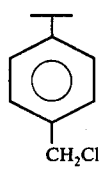

After conducting the phosphonylation reaction described above in connection with the detailed preparation of the Example 7-type polymer for 3 hours rather than 4 hours, approximately 2% of the benzylic chloro moieties remained.

In the case of phosphonylation of the PPO-type materials (e.g., as described in Example 17 above) partial phosphonylation leaves residual groups of the following type:

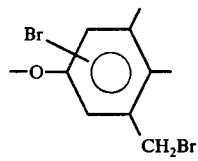

In either case partial phosphonylation to leave from about 2 to 7% benzylic halogen is sufficient to permit subsequent cross-linking and chemical bonding.

Partially phosphonylated polymers thus prepared were alloyed with acetyl cellulose and cast into films in the manner described in Examples 21-34 above. After casting, the films were heat-treated by reflux in decalin for 2 hours, and thereafter oven-treated for 1 hour at 120° C. Cross-linking was completed by thereafter immersing the films with 10% pyridine in water overnight at room temperature.

EXAMPLE 43

Cross-Linked PSP/Acetyl Cellulose Polymer Alloy Pervaporation Membrane

A PSP polymer was subjected to partial phosphonylation, admixed with acetyl cellulose in equal proportions by weight, cast, heat-treated and water/pyridine treated in the manner described in Example 42. The membrane was tested in a pervaporation cell as described in connection with Example 38 hereof for pervaporative separation of an azeotrope-forming mixture of benzene/cyclohexane (55/45%). The following results were obtained:

| Feed Composition | Temperature ° C | Separation Factor |
| --- | --- | --- |
| Benzene/cyclohexane 55/45 | 78 | 12 |
| Benzene/cyclohexane 55/45 | 50 | 16 |

The membrane was tested for 1500 hours, under azeotropic reflux conditions. No changes in membrane performance were noted.

EXAMPLE 44

Cross-Linked PPOBrP$_1$/Acetyl Cellulose Polymer Alloy Pervaporation Membrane

A membrane was prepared from a polymer alloy of PPOBrP$_1$/acetyl cellulose (equal proportions by weight) in the manner described in Example 43. The membrane was tested in a pervaporation cell with the same azeotrope-forming benzene/cyclohexane mixture and under the same conditions as noted in that example. The following results were obtained:

| Feed Composition | Temperature ° C | Separation Factor |
| --- | --- | --- |
| Benzene/cyclohexane 55/45 | 78 | 14.5 |
| Benzene/cyclohexane 55/45 | 50 | 18 |

After 1500 hours under reflux conditions, no change in membrane performance was noted.

It will be understood that various changes may be made in the preferred embodiments described hereinabove without departing from the scope of the present invention. Accordingly, it is intended that the preceding description be construed as illustrative and not in a limiting sense.

What is claimed is:

1. A polymer alloy of
   a. a phosphorus-containing polymer component having the formula:

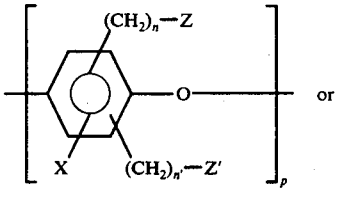

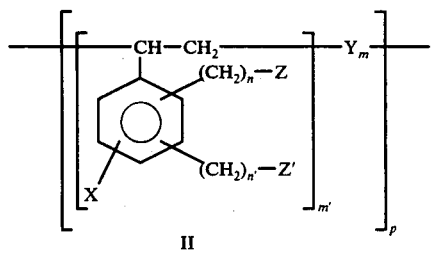

wherein X is hydrogen or halo; Z and Z' are each hydrogen or a phosphonate group PO(OR)(OR$_1$) in which R and R$_1$ may be the same or different and are each alkyl or aryl, and in which Z and Z' are not both hydrogen; Y is a bivalent radical from an ethylenically unsaturated monomer copolymerized with styrene; $m$ is zero or an integer less than 10; $m'$ is an integer less than 10; $n$ is any integer; $n'$ is zero or any integer; and $p$ is an integer greater than 10; and
   b. a second polymer component compatible with and alloyed with the phosphorus-containing polymer component, said second component being a cellulose ester, or a polystyrene or unsaturated polyester resin.

2. The polymer alloy of claim 1, wherein at least one of the X and X' moieties of component (a) is a phosphonate group in which R and R$_1$ are each alkyl having from 1 to 3 carbon atoms.

3. The polymer alloy of claim 1, wherein the X moiety is bromo.

4. The polymer alloy of claim 1, wherein component (a) is a polymer of Formula I.

5. The polymer alloy of claim 1, wherein component (a) is a polymer of Formula II.

6. The polymer alloy of claim 5, wherein Y is $CH_2CHCl$ or $CH_2CCl_2$.

7. The polymer alloy of claim 5, wherein $m$ is zero.

8. The polymer alloy of claim 1, wherein from 93 to 98 percent of the benzylic halogen groups on the aromatic moiety of polymeric component (a) are phosphonylated, and in which components (a) and (b) are cross-linked and chemically bonded to one another through the halogenated benzylic moieties thereon.

9. A non-flammable or self-extinguishable fiber, film, fabric or shaped or foamed plastic article, constituted of the polymer alloy of claim 1.

* * * * *